United States Patent [19]
Treinies et al.

[11] Patent Number: 5,974,870
[45] Date of Patent: Nov. 2, 1999

[54] PROCESS FOR MODEL-ASSISTED DETERMINATION OF THE FRESH-AIR MASS FLOWING INTO THE CYLINDERS OF AN INTERNAL COMBUSTION ENGINE WITH EXTERNAL EXHAUST-GAS RECYCLING

[75] Inventors: Stefan Treinies, Regensburg; Gerd Rösel, Dresden; Maximilian Engl, Regensburg, all of Germany

[73] Assignee: Siemens Aktiengesellschaft, Munich, Germany

[21] Appl. No.: 09/153,506

[22] Filed: Sep. 15, 1998

Related U.S. Application Data

[63] Continuation of application No. PCT/DE97/00529, Mar. 14, 1997.

[30] Foreign Application Priority Data

Mar. 15, 1996 [DE] Germany .......................... 196 10 290

[51] Int. Cl.[6] .................................................. G01M 15/00
[52] U.S. Cl. ........................................................ 73/118.2
[58] Field of Search .................................. 73/116, 117.2, 73/117.3, 118.2; 123/676, 568.11

[56] References Cited

U.S. PATENT DOCUMENTS

| | | | |
|---|---|---|---|
| 4,892,072 | 1/1990 | Miwa et al. | 73/118.2 |
| 5,094,213 | 3/1992 | Dudek et al. | |
| 5,205,260 | 4/1993 | Takahashi et al. | |
| 5,270,935 | 12/1993 | Dudek et al. | 73/118.2 |
| 5,377,112 | 12/1994 | Brown, Jr. et al. | 73/118.2 |
| 5,597,951 | 1/1997 | Yoshizaki et al. | 73/118.2 |
| 5,714,683 | 2/1998 | Maloney | 73/118.2 |
| 5,803,608 | 9/1998 | Randoll et al. | 73/118.2 |

FOREIGN PATENT DOCUMENTS

| | | |
|---|---|---|
| 0 719 919 A2 | 1/1996 | European Pat. Off. . |
| 39 19 448 A1 | 12/1989 | Germany . |

OTHER PUBLICATIONS

International Publication No. WO 95/06295 (Bush et al.), dated Mar. 2, 1995.

*Primary Examiner*—George Dombroske
*Assistant Examiner*—Eric S. McCall
*Attorney, Agent, or Firm*—Herbert L. Lerner; Laurence A. Greenberg

[57] ABSTRACT

A method for calculating an actual fresh-air mass flowing into a cylinder with the aid of an inlet pipe flow model. The description of the flow model is based on a nonlinear differential equation. The chosen model approach contains modeling of an external exhaust-gas recycling system, variable inlet systems and systems with variable control valves. The model-assisted load detection method can be used in engine control systems based on air mass flow and on inlet pipe pressure. A correction algorithm, in the form of a model control loop allows permanent improvement of accuracy when the model parameters are inexact. That is to say model balancing is provided in steady and unsteady operational states.

19 Claims, 4 Drawing Sheets

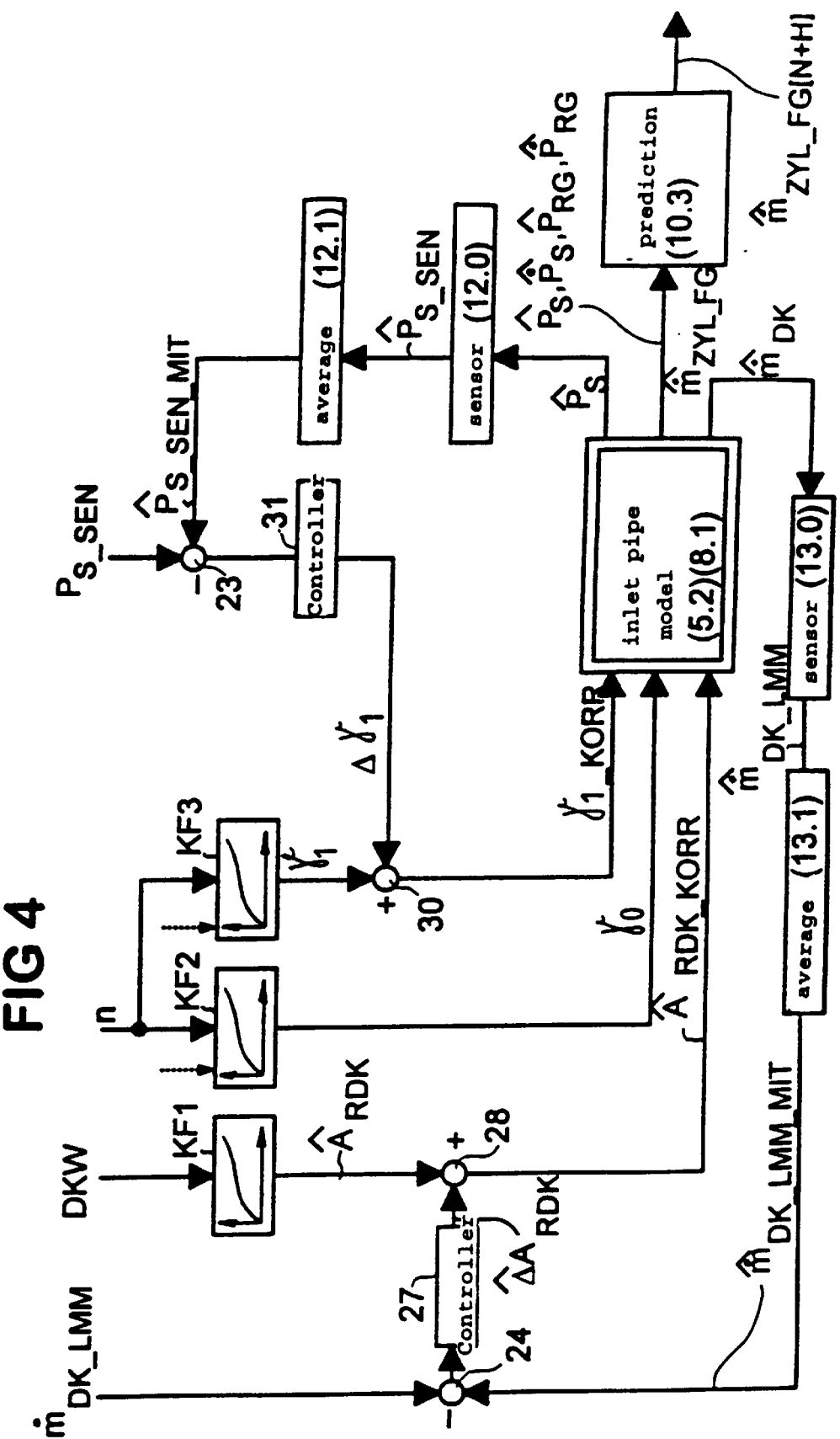

PROCESS FOR MODEL-ASSISTED DETERMINATION OF THE FRESH-AIR MASS FLOWING INTO THE CYLINDERS OF AN INTERNAL COMBUSTION ENGINE WITH EXTERNAL EXHAUST-GAS RECYCLING

CROSS-REFERENCE TO RELATED APPLICATION

This is a continuation of International Application No. PCT/DE97/00529, filed on Mar. 14, 1997, which designated the United States.

BACKGROUND OF THE INVENTION

Field of the Invention

The invention relates to a process for model-assisted determination of a fresh-air mass flowing into the cylinders of an internal combustion engine with external exhaust-gas recycling. The internal combustion engine has an inlet pipe, a throttle valve, a first sensor device for detecting the degree that the throttle valve is open, an exhaust-gas recycling device with an exhaust-gas recycling valve, a second sensor device for detecting the degree that the exhaust-gas recycling valve is open, a load sensor for producing a load signal for the internal combustion engine, and an electronic control device which calculates a basic injection time on a basis of the load signal and a speed of the internal combustion engine.

Engine control systems for internal combustion engines which operate with fuel injection use either the air mass taken in by the engine or the inlet pipe pressure as a measure of the engine load.

For calculating the injection time, engine control systems based on air mass require an input defining the quantity of fresh-air mass flowing out of the inlet pipe and into the respective cylinders. If the internal combustion engine is equipped with an external exhaust-gas recycling device, with the aid of which part of the exhaust gas is recycled into the inlet tract, then in unsteady operation, which for example may be caused by a change in the external exhaust-gas recycling rate and/or the throttle valve setting, the signal of an air mass meter disposed downstream of the throttle valve does not represent a measure of the actual flow into the cylinders. The flow varies in accordance with the change in the fresh-gas partial pressure in the inlet pipe, so that the absolute pressure and the partial pressures in the inlet pipe need to be known for exact determination of the load variable.

Engine control systems based on the inlet pipe pressure can only detect the absolute pressure in the inlet pipe when using a pressure measurement device. However, since the proportioning of the fuel is determined by the fresh-gas partial pressure, it is necessary for the fresh-gas partial pressure and, in the case of control on the basis of exhaust-gas recycling, also the residual-gas partial pressure to be determined in suitable fashion.

Model-assisted calculation methods based on physical approaches represent a good starting point for the accurate determination of the air mass.

In Published, Non-Prosecuted, German Patent Application P 195 13 601.2 A1, owned by the applicant of the instant application and corresponding to U.S. patent application Ser. No. 08/949,169, a process is described for the model-assisted determination of the air mass flowing into the cylinders of the internal combustion engine without exhaust-gas recycling. With the aid of an inlet pipe flow model, the variables inlet pipe pressure, air mass flow at the throttle valve and air mass flow into the cylinder are in this case specified from the degree to which the throttle valve is open and the engine speed. A load variable is calculated from the variable and on the basis of which the injection time is determined.

On the basis of the signal of the load detection sensor, that is to say the air mass meter or the inlet pipe pressure sensor, the effect of parameter errors in the inlet pipe flow model are reduced via a model control loop, by minimizing the deviations between the measured variables and the corresponding model variables. The approach allows permanent model correction in steady and unsteady motor operation, so that the load variable of the internal combustion engine can be estimated with a high degree of accuracy.

A device for controlling and determining in advance the intake air quantity of an internal combustion engine controlled on the basis of inlet pipe pressure, in which the degree to which the throttle valve is open and the engine speed are used as a basis for calculating the current value of the air taken into the combustion chamber of the engine is disclosed in German Patent DE 39 19 488 C2. The calculated present intake air quantity is then used as a basis for calculating the value determined in advance for the intake air quantity which is taken into the combustion chamber of the engine at a particular time from the point when the calculation was made. The pressure signal measured downstream of the throttle valve is corrected with the aid of theoretical relationships, so that an improvement is achieved in the determination of the air mass taken in, and a more accurate calculation of the injection time is therefore possible.

SUMMARY OF THE INVENTION

It is accordingly an object of the invention to provide a process for model-assisted determination of the fresh-air mass flowing into the cylinders of an internal combustion engine with external exhaust-gas recycling which overcomes the above-mentioned disadvantages of the prior art methods of this general type, in which the fresh-gas and residual-gas partial pressure in an inlet pipe are determined as exactly as possible in steady and unsteady engine operation, and can be employed as a basis for an accurate calculation of the injection time.

With the foregoing and other objects in view there is provided, in accordance with the invention, in a process for determining a quantity of fresh-air mass flowing into a cylinder of an internal combustion engine, the internal combustion engine having an inlet pipe, a throttle valve, a first sensor device for detecting a degree of opening of the throttle valve, an exhaust-gas recycling device with an exhaust-gas recycling valve, a second sensor device for detecting a degree of opening of the exhaust-gas recycling valve, a load sensor producing a load signal, and an electronic control device calculating a basic injection time on a basis of the load signal and a speed of the internal combustion engine, the improvement which includes:

reproducing conditions in the inlet pipe using an inlet pipe flow model, and using the degree of opening of the throttle valve, the degree of opening of the exhaust-gas recycling valve, an ambient pressure, an exhaust-gas temperature, a temperature in the inlet pipe and parameters representing a valve setting as input variables of the inlet pipe flow model;

forming a model variable for an air mass flow at the throttle valve and for a residual-gas mass flow at the exhaust-gas recycling valve;

forming a model variable for an air mass flow into the cylinder as a function of an inlet pipe pressure;

forming a model variable for a residual-gas mass flow into the cylinder as a function of a residual-gas partial pressure;

calculating the inlet pipe pressure as a decisive variable for determining an actual load of the internal combustion engine from the model variables of air mass flow at the throttle valve, the residual-gas mass flow at the exhaust-gas recycling valve and the air mass flow into the cylinder;

calculating the residual-gas partial pressure in the inlet pipe from the model variables of the residual-gas mass flow at the exhaust-gas recycling valve and the residual-gas mass flow into the cylinder;

determining a fresh-gas partial pressure from the inlet pipe pressure and the residual gas partial pressure; and deriving a total air mass flowing into the cylinder by integrating a relationship between the fresh-gas partial pressure and a fresh-air mass flow into the cylinder.

In accordance with an added feature of the invention, there is the step of defining with the aid of a flow equation for ideal gases through throttle points the model variables for the air mass flow at the throttle valve and for the residual-gas mass flow at the exhaust-gas recycling valve.

In accordance with an additional feature of the invention, there is the step of taking into account flow losses occurring at the throttle points by reducing flow cross sections at the throttle points.

In accordance with an another feature of the invention, there is the step of establishing values for the reduced flow cross sections from steady-state measurements as a function of the degree of opening of the exhaust-gas recycling valve on an engine test bed, and entering the values in performance characteristics stored in a memory of the electronic control device.

In accordance with a further added feature of the invention, there is the step of representing the model variables for the air mass flow at the throttle valve and the model variable for the residual-gas mass flow at the exhaust-gas recycling valve by dividing a flow function present in the flow equation into individual sections and approximating the sections by straight-line sections, determining values of a slope and an offset of respective straight-line sections as a function of ratios of the inlet pipe pressure to the ambient pressure and of the inlet pipe pressure to an exhaust-gas back pressure, respectively, and storing the values in a performance characteristic stored in a memory of the electronic control device.

In accordance with a further additional feature of the invention, there are the steps of defining the model variable for the air mass flow into the cylinder as a linear function of the inlet pipe pressure; and establishing a slope and an offset of the linear function as a function of at least one parameter including the speed of the internal combustion engine, cylinder number, inlet pipe geometry, air temperature in the inlet pipe and valve control times.

In accordance with yet another feature of the invention, there are the steps of defining the model variable for the residual-gas mass flow into the cylinder as a linear function of the residual-gas partial pressure; and establishing a slope of the linear function as a function of at least one parameter including the speed of the internal combustion engine, cylinder number, inlet pipe geometry, air temperature in the inlet pipe and valve control times.

In accordance with yet another additional feature of the invention, there is the step of determining the at least one parameter by steady-state measurements on the engine test bed and entering the at least one parameter in performance characteristics stored in a memory of the electronic control device.

In accordance with an added feature of the invention, there is the step of using the load signal measured by the load sensor for correcting and balancing the model variables of the air mass flow at the throttle valve and the inlet pipe pressure in a model control loop, and using the load signal as a reference variable of the control loop.

In accordance with an additional feature of the invention, there is the step of carrying out the correcting and balancing step in one of steady and unsteady operation of the internal combustion engine for taking into account a response of the load sensor.

In accordance with an another feature of the invention, there is the step of modeling the response of the load sensor with a first-order system having a delay time dependent on a working point.

In accordance with a further added feature of the invention, there are the steps of assigning each measured value of the degree of opening of the throttle valve a value of a reduced cross section of the throttle valve; and correcting the reduced cross section by a correction variable for minimizing a deviation between a reference variable and the model variable of the air mass flow at the throttle valve for balancing the model variable of the air mass flow at the throttle valve.

In accordance with a further additional feature of the invention, there is the step of assigning each measured value of the degree of opening of the exhaust-gas recycling valve a value of a reduced cross section of the exhaust-gas recycling valve; and correcting the reduced cross section by a correction variable to minimize the deviation between a reference variable and the model variable of the inlet pipe pressure for balancing the model variable of the inlet pipe pressure.

In accordance with yet another feature of the invention, there is the step of averaging the model variable before performing the correcting step.

In accordance with yet another added feature of the invention, there is the step of increasing the model variable of the exhaust-gas back pressure if the correction variable exceeds a predetermined threshold value in a positive direction, and reducing the model variable of the exhaust-gas back pressure if the correction variable falls below a negative threshold.

In accordance with yet another additional feature of the invention, there is the step of calculating the air mass flowing into the cylinder by the relationship $$\hat{m}_{Zyl}[N] = \frac{T_A}{2} \cdot \left( \hat{m}_{Zyl}[N-1] + \hat{m}_{Zyl}[N] \right)$$

with $T_A$ sampling time or segment time, $\hat{m}_{Zyl}[N]$ model variable of the air mass flow during the current sampling step or segment, and $\hat{m}_{Zyl}[N-1]$ model variable of the air mass flow during the previous sampling step or segment.

In accordance with a concomitant feature of the invention, there is the step of estimating a fresh-gas mass flowing into the cylinder of the internal combustion engine for a specific prediction horizon lying in the future relative to a current load detection at a sampling time on a basis of time variations in the model variables of the residual-gas partial pressure and the fresh-gas partial pressure in the inlet pipe.

Other features which are considered as characteristic for the invention are set forth in the appended claims.

Although the invention is illustrated and described herein as embodied in a process for model-assisted determination of the fresh-air mass flowing into the cylinder of an internal combustion engine with external exhaust-gas recycling, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a block diagram of the model control loop for correcting a relationship between an inlet pipe pressure and the air mass, when the exhaust-gas recycling is switched off.

DESCRIPTION OF THE PREFERRED EMBODIMENTS

Figure 1:
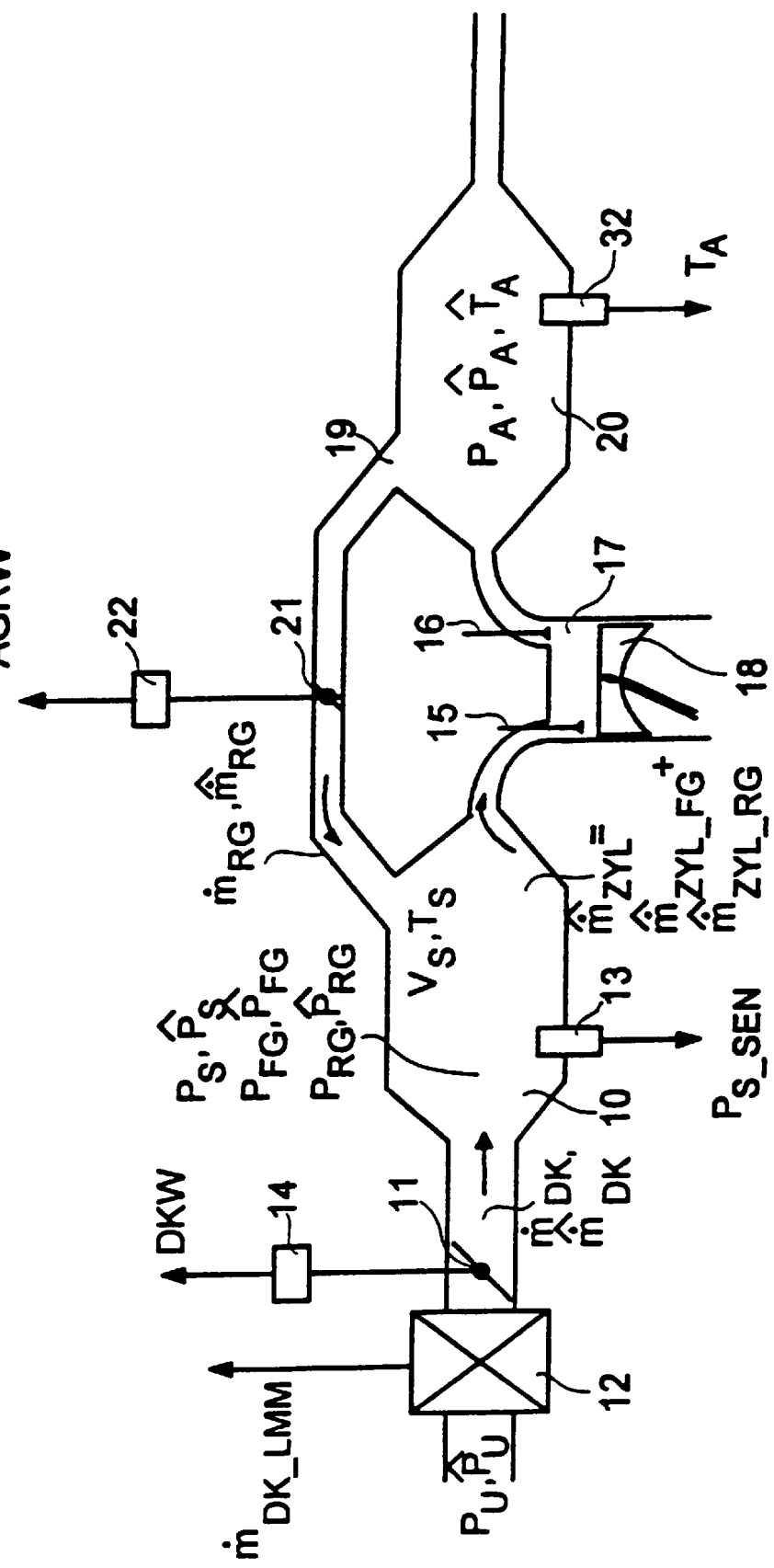
FIG. 1 is a diagrammatic illustration of an inlet system of an Otto-cycle internal combustion engine, including a corresponding model and measured variables according to the invention.

Referring now to the figures of the drawing in detail and first, particularly, to FIG. 1 thereof, there is shown on the basis of a known approach, model description results which are based on a non-linear differential equation. An approximation of the non-linear equation will be presented below. As a result of the approximation, the system behavior can be described by a bilinear equation that allows rapid solution of the relationship in the engine control unit of the motor vehicle under real-time conditions. The chosen model approach in this case contains modeling of the external exhaust-gas recycling, the variable inlet systems and systems with variable valve control. The effects due to the configuration and due to dynamic secondary loading, that is to say reflections of pressure waves in the inlet pipe, can be taken into account very well only through the choice of steady-state determinable parameters of the model. All the model parameters are, on the one hand, physically interpretable and, on the other hand, to be obtained exclusively from steady-state measurements.

Most algorithms for time-discrete solutions of the differential equations for the model of an intake system require, above all when there is a small pressure drop across the throttle valve, that is to say under full load, a very small computation step size in order to work with numerical stability. The consequence would be an unacceptable computing cost in determining the load variable. Since load detection systems usually operate with segment synchrony, that is to say a measurement is sampled every 180° of crankshaft angle for 4-cylinder motors, the model equation must likewise be solved with segment synchrony. An absolutely stable difference scheme for solving differential equations will be used below, which guarantees numerical stability with arbitrary step size.

The system for model-assisted load detection can be used in known engine control systems. That is to say in engine control systems based on air mass and on inlet pipe pressure. A correction algorithm will be formulated below in the form of a model control flow which, when inaccuracies occur in model parameters, acts as a permanent improvement in accuracy, that is to say model balancing in steady and unsteady operation.

The outline representation represented in FIG. 1 will be used as a basis in the model-assisted calculation of the fresh-air mass flowing into the cylinders of the internal combustion engine. For the sake of clarity, only one cylinder of the internal combustion engine is represented. Reference number 10 denotes an internal combustion engine inlet pipe in which a throttle valve 11 is disposed. The throttle valve 11 is connected to a throttle valve setting sensor 14 that determines the degree to which the throttle valve 11 is open. An air mass meter 12 is disposed upstream of the throttle valve 11, and an inlet pipe pressure sensor 13 is disposed in the inlet pipe 10 downstream of the throttle valve 11. The output signals $\dot{m}_{DK\_LMM}$, DKW, $P_{S\_SEN}$ of the air mass meter 12, of the throttle valve setting sensor 14 and of the inlet pipe pressure sensor 13 are connected to inputs of an electronic control device (see FIGS. 3–4) of the internal combustion engine. Further, FIG. 1 also schematically represents an intake valve 15, an outlet valve 16 as well as a piston 18 that moves in a cylinder 17.

In order to recycle a part of the exhaust gas in the direction marked with an arrow symbol, an exhaust-gas recycling line 19 is provided which connects an exhaust-gas tract 20 to the inlet pipe 10 in such a way that exhaust gas can be introduced into the inlet pipe 10 downstream of the throttle valve 11. A temperature sensor 32 disposed in the exhaust-gas tract 20 outputs a signal corresponding to the temperature of the exhaust gas to the control device of the internal combustion engine. An exhaust-gas recycling valve 21 is connected into the exhaust-gas recycling line 19. The valve 21 either being configured as a pneumatically operating valve and then driven by an electro-pneumatic transducer using a duty ratio, or is produced as an electrically actuated valve and, through corresponding drive signals from the electronic control device of the internal combustion engine, changes the aperture cross section of the exhaust-recycling line 19. The exhaust-gas recycling valve 21 is assigned a setting sensor 22 which outputs a signal AGRW corresponding to the degree to which the exhaust-gas recycling valve 21 is open to the electronic control device.

FIG. 1 further indicates selected variables or parameters of the inlet system. In this case, the hat symbol "^" over a variable indicates that it is a model variable, while variables without a hat symbol represent measured variables.

Specifically, $P_U$ indicates the ambient pressure, $P_S$ the inlet pipe pressure, $T_S$ the temperature of the air in the inlet pipe, $V_S$ the inlet pipe volume, $P_A$ the exhaust-gas back pressure, $T_A$ the exhaust-gas temperature, $P_{RG}$ the residual-gas partial pressure in the inlet pipe, and $P_{FG}$ the fresh-gas partial pressure in the inlet pipe.

Variables with a dot symbol denote the first derivative of the corresponding variables with respect to time. $\dot{m}_{DK}$ denotes the air mass flow at the throttle valve, $\dot{m}_{RG}$ denotes the residual-gas mass flow at the exhaust-gas recycling valve, $\dot{m}_{Zyl\_FG}$ denotes the fresh-gas mass flow into the cylinder and $\dot{m}_{Zyl\_RG}$ denotes the residual-gas mass flow, and $\dot{m}_{Zyl}$ denotes the total mass flow into the cylinder.

If the exhaust-gas back pressure, the degree to which the exhaust-gas recycling valve is open and the exhaust-gas temperature are known, either through parameterization, as a function of the operating point, using performance characteristics, or by evaluating the signals from the corresponding sensors, it is possible to calculate the mass flow through the exhaust-gas recycling valve.

With the assumption of constant temperature for the air in the inlet pipe, the differential equation for calculating the absolute pressure in the inlet pipe can be set up from the ideal gas state equation (cf. FIG. 1):

$$\dot{\hat{P}}_S = \frac{R_L \cdot T_S}{V_S} \cdot (\hat{\dot{m}}_{DK} + \hat{\dot{m}}_{RG} - \hat{\dot{m}}_{Zyl}) \quad (1.0)$$

In the equation:

$\dot{\hat{P}}_S$: is the derivative of the model variable inlet pipe pressure with respect to time, $R_L$: is the universal gas constant, $T_S$: is the temperature of the air in the inlet pipe $V_S$: is the inlet pipe volume, $\hat{\dot{m}}_{DK}$: is the model air mass flow at the throttle valve, $\hat{\dot{m}}_{RG}$: is the model residual-gas mass flow at the exhaust-gas recycling valve, and $\hat{\dot{m}}_{Zyl}$: is the model variable of the total mass flow into the cylinder.

The conditions described by equation (1.0) can be used without structural modifications for multicylinder internal combustion engines with ram pipe and/or resonant inlet systems.

For systems with multipoint injections, in which the fuel is apportioned through a plurality of injection valves, equation (1.0) reproduces the conditions more accurately than is the case with single point injections. That is to say injections in which the fuel is apportioned by a single fuel injection valve. In the former type of fuel apportioning, substantially the entire inlet system is filled with air. A fuel/air mixture is present only in a small region preceding the inlet valves. In contrast to this, with single-point injection systems the entire inlet pipe, from the throttle valve to the intake valve, is filled with fuel/air mixture, since the injection valve is disposed before the throttle valve. In this case, the assumption of an ideal gas represents more of an approximation than is the case with multipoint injection. In the case of single point injection, the fuel is apportioned in accordance with $\hat{\dot{m}}_{DK}$, and in the case of multipoint injections it is apportioned in accordance with $\hat{\dot{m}}_{Zyl}$.

The calculation of the mass flows $\hat{\dot{m}}_{DK}$ and $\hat{\dot{m}}_{Zyl}$ cell will be described in more detail below.

The model variable of the air mass flow $\hat{\dot{m}}_{DK}$ at the throttle valve is described by the flow equation for ideal gases through throttle points. The air mass flow $\hat{\dot{m}}_{DK}$ is accordingly determined by the relationship $$\hat{\dot{m}}_{DK} = \hat{A}_{RDK} \sqrt{\frac{2\kappa}{\kappa-1} \cdot \frac{1}{R_L \cdot T_S}} \cdot \hat{P}_U \cdot \psi \quad (2.0)$$

with the flow function $$\psi = \sqrt{\left(\frac{\hat{P}_S}{\hat{P}_U}\right)^{\frac{2}{\kappa}} - \left(\frac{(\hat{P})_S}{\hat{P}_U}\right)^{\left(\frac{\kappa+1}{\kappa}\right)}}$$

for supercritical pressure conditions or $\psi$=constant for critical pressure conditions, respectively.

In the equation:

$\hat{\dot{m}}_{DK}$: is the model variable of the air mass flow at the throttle valve, $\hat{A}_{RDK}$: is the reduced flow cross section, $\kappa$: is an adiabatic exponent, $R_L$: is the universal gas constant, $T_S$: is the temperature of the air in the inlet tube, $\hat{P}_U$: is the model variable of the ambient pressure, $\hat{P}_S$: is the model variable of the inlet pipe, and $\psi$: is the flow function.

Flow losses occurring at the throttle point, that is to say at the throttle valve 11, are taken into account by the reduced cross section $\hat{A}_{RDK}$ at the throttle valve. From steady-state measurements, it is possible for known pressures in front of and behind the throttle point and known mass flow through the throttle point, to give a correspondence between the throttle valve angle DKW determined by the throttle valve setting sensor 14 and the corresponding reduced cross section $\hat{A}_{RDK}$.

If the air mass flow $\hat{\dot{m}}_{DK}$ at the throttle valve is described by equation (2.0), then this entails a complicated algorithm for the numerically correct solution of the differential equation (1.0) with an absolutely stable difference scheme. In order to reduce the computing cost, the flow function $\psi$ is approximated by a polynomial.

Figure 2:
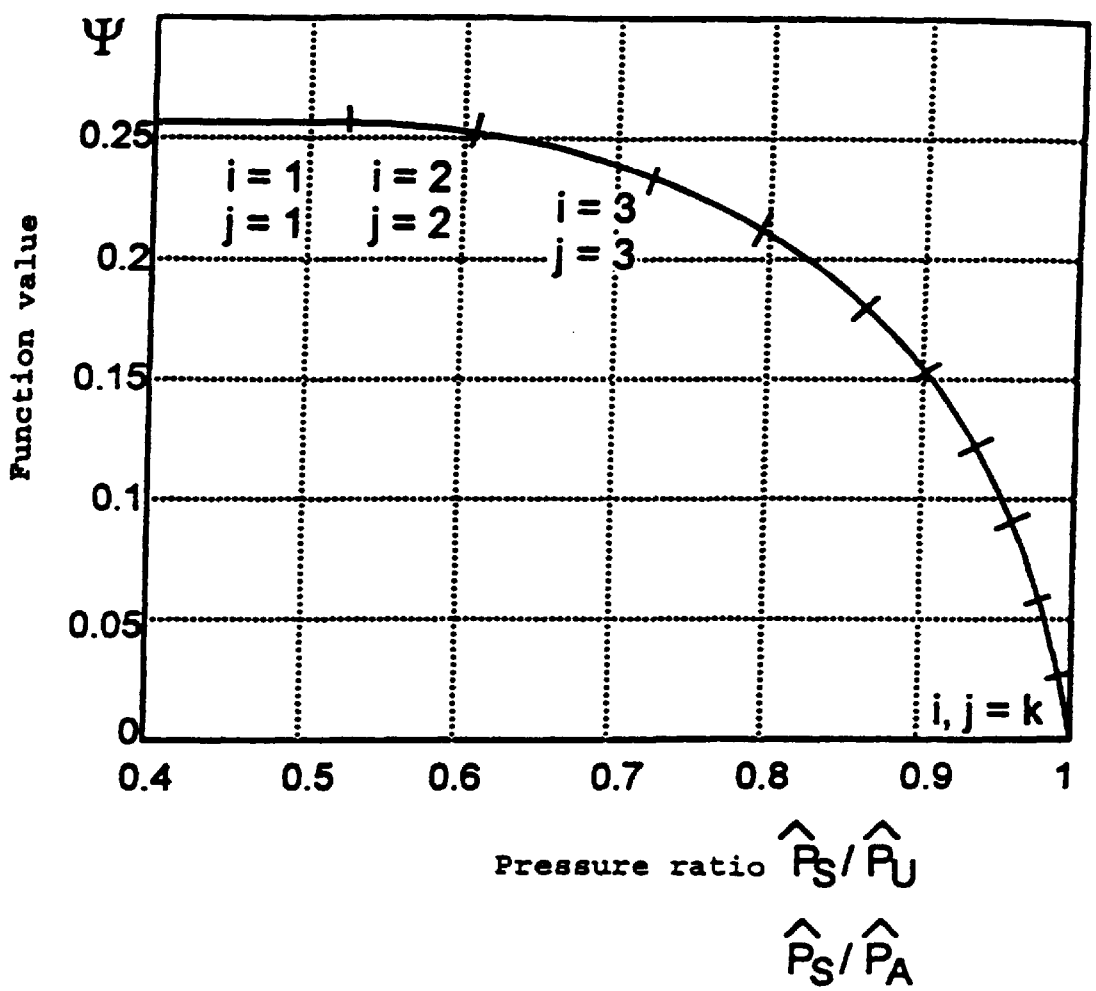
FIG. 2 is a graph showing a flow function and an associated polygon approximation.

FIG. 2 shows the profile of the flow function and the approximation principle applied to it. Within a section i, j (i, j=1 . . . k), the flow function $\psi$ is represented by a straight line. With a tolerable number of straight-line sections, it is therefore possible to achieve a good approximation of the flow function by $$\psi = \left(m_i \frac{\hat{P}_S}{\hat{P}_U} + n_i\right) i = (1\ldots k) \quad (2.2)$$

In this form, $m_i$ describes the gradient and $n_i$ the offset of the respective straight-line section. The values $m_i$, $n_i$ are respectively valid in the individual sections of the linearization. The values for the gradient and for the offset are entered in tables as a function of the ratio $$\frac{\hat{P}_S}{\hat{P}_U}$$

of the inlet pipe pressure to the ambient pressure.

The pressure ratio $$\frac{\hat{P}_S}{\hat{P}_U},$$

or the ratio $$\frac{\hat{P}_S}{\hat{P}_A}$$

of the inlet pipe pressure to the exhaust-gas back pressure, is plotted on the abscissa of FIG. 2, and the function value (0–0.3) of the flow function ψ is plotted on the ordinate.

Through an approach of this type, it is possible to approximate equation (2.0) for calculating the air mass flow $\hat{m}_{DK}$ at the throttle valve by the equation $$\hat{m}_{DK} = \hat{A}_{RDK} \cdot \sqrt{\frac{2\kappa}{\kappa-1} \cdot \frac{1}{R_L \cdot T_S}} \cdot \hat{P}_U \cdot \left(m_i \frac{\hat{P}_S}{\hat{P}_U} + n_i\right) \quad (2.3)$$

for i=(1 ... k).

The calculation of the residual-gas mass flow at the exhaust-gas recycling valve 21 likewise takes place with the ideal gas flow equation for throttle points. In the exhaust-gas recycling valve, however, it is the pressure drop between the exhaust-gas back pressure $P_A$ and the inlet pipe pressure $P_S$ which prevails, as well as the exhaust-gas temperature level $T_A$. For the approximation of the flow function ψ, it is in this case the values $m_j$ and $n_j$ which are to be taken into account, since the ambient pressure $\hat{P}_U$ differs from the exhaust-gas back pressure $\hat{P}_A$ (FIG. 2). Flow losses that occur are described by the reduced flow cross section $A_{RRG}$ at the throttle point of the exhaust-gas recycling valve.

$$\hat{m}_{RG} = \hat{A}_{RRG} \cdot \sqrt{\frac{2\kappa}{\kappa-1} \cdot \frac{1}{R_L \cdot T_A}} \cdot \hat{P}_U \cdot \left(m_j \frac{\hat{P}_S}{\hat{P}_U} + n_j\right) \quad (3.0)$$

The air mass flowing into the respective cylinder of the internal combustion engine can be calculated analytically only with great difficulty, since it depends strongly on the charge cycle. The filling of the cylinders is determined extensively by the inlet pipe pressure, the engine speed and by the valve control times.

Maximally accurate calculation of the mass flow $\hat{m}_{Zyl}$ into the respective cylinder therefore requires, on the one hand, description of the conditions in the intake tract of the internal combustion engine by partial differential equations and, on the other hand, calculation of the mass flow at the intake valve according to the flow equation as a requisite boundary condition. Only this complicated approach makes it possible to take into account dynamic secondary charge effects, which are decisively affected by the engine speed, the inlet pipe geometry, the cylinder number and the valve control times.

Since calculations according to the approach mentioned above are unfeasible in electronic control devices of the internal combustion engine, a possible approximation of a simple relationship between the inlet pipe pressure $\hat{P}_S$ and the cylinder mass flow $\hat{m}_{Zyl}$ will suffice. For a wide range of realistic valve control times, a linear formulation of the following form may be used as a good approximation:

$$\hat{m}_{Zyl} = \gamma_1 \cdot \hat{P}_S + \gamma_0 \quad (4.0)$$

The gradient $\gamma_1$ and the offset $\gamma_0$ in equation (4.0) are in this case, taking into account all essential influencing factors, functions of the engine speed, the inlet pipe geometry, the cylinder number, the valve control times and the temperature $T_S$ of the air in the inlet pipe. The dependency of the values of $\gamma_1$ and $\gamma_0$ on the influencing variables of engine speed, inlet pipe geometry, cylinder number and valve control times and valve excursion curves can in this case be determined through steady-state measurements. The value determination will likewise reproduce well the effect of ram pipe and/or resonant inlet systems on the air mass taken in by the internal combustion engine. The values of $\gamma_1$ and $\gamma_0$ are entered in performance characteristics of the electronic motor control device as a function of the engine speed n.

As a determining variable for determining the engine load, the inlet pipe pressure $P_S$ is selected. With the aid of the model differential equation, the variable is to be estimated as exactly and rapidly as possible. The estimation of $\hat{P}_S$ requires solution of equation (1.0).

With equations (2.3), (3.0) and (4.0), the formula (1.0) can be approximated by the equation $$\left(\hat{A}_{RDK} \cdot \sqrt{\frac{2\kappa}{(\kappa-1) \cdot R_L \cdot T_S}} \cdot \hat{P}_U \cdot \left[m_i \cdot \frac{\hat{P}_S}{\hat{P}_U} + n_i\right] + \hat{P}_S = \right. \quad (5.0)$$

$$\frac{R_L \cdot T_S}{V_S} \cdot \hat{A}_{RRG} \cdot \sqrt{\frac{2\kappa}{(\kappa-1) \cdot R_L \cdot T_A}} \cdot$$

$$\left. \hat{P}_A \cdot \left[m_j \cdot \frac{\hat{P}_S}{\hat{P}_A} + n_j\right] - \{\gamma_1 \cdot \hat{P}_S + \gamma_0\}\right)$$

for i, j–(1 ... k).

To solve equation (5.0), the relationship is transposed into a suitable difference equation.

The following basic requirements for the solution properties of the difference equation to be formed may be formulated as a criterion for selecting the suitable difference scheme:

a) the difference scheme must be conservative even under extremely dynamic requirements, that is to say the solution of the difference equation must correspond to the solution of the differential equation, and b) the numerical stability must be guaranteed for sampling times which correspond to the maximum possible segment times, throughout the working range (dynamic range) of the inlet pipe pressure.

Requirement a) can be met by an implicit computation algorithm. On account of the approximation of the non-linear differential equation (1.0) by a bilinear equation (5.0), the resulting implicit solution scheme can be solved without using iterative methods, since the difference equation can be transposed into an explicit form.

On account of the conditioning of the differential equation (1.0) and its approximation (5.0), the second requirement b) can be met only by a computing rule, for forming the difference equation, which works with absolute stability. Those methods are also referred to as A-stable methods. Characteristic for the A-stability is the property of the algorithm that, for a stable initial problem, it is numerically stable for arbitrary values of the sampling time, that is to say the segment time $T_{AB}$. One possible computing rule for the numerical solution of differential equations, which satisfies both requirements, is the trapezium rule.

In the present case, the difference equation resulting from application of the trapezium rule reads as follows:

$$\hat{P}_S[N] = \hat{P}_S[N-1] + \frac{T_{AB}}{2} \cdot \left(\dot{\hat{P}}_S[N-1] + \dot{\hat{P}}_S[N]\right) \quad (5.1)$$

for N=(1 . . . ∞) $T_{AB}$ denotes the time between 2 sampling steps N.

If the differential equation (5.0) is solved with the aid of the trapezium rule (5.1), then the following equation results for the inlet pipe pressure to the sampling step N:

$$\hat{P}_S[N] = \frac{\hat{P}_S[N-1] + \frac{T_{AB}}{2} \cdot \dot{\hat{P}}_S[N-1]}{1 - \frac{T_{AB}}{2} \cdot \frac{R_L \cdot T_S}{V_S} \cdot \left(\hat{A}_{RDK}[N] \cdot \sqrt{\frac{2\chi}{\chi-1} \frac{1}{R_L \cdot T_S}} \cdot m_i + \hat{A}_{RRG}[N] \cdot \sqrt{\frac{2\chi}{\chi-1} \frac{1}{R_L \cdot T_A}} \cdot m_j - \gamma_1\right)} +$$

$$\frac{\frac{T_{AB}}{2} \cdot \frac{R_L \cdot T_S}{V_S} \cdot \left(\hat{A}_{RDK}[N] \cdot \sqrt{\frac{2\chi}{\chi-1} \frac{1}{R_L \cdot T_S}} \cdot n_i \cdot \hat{P}_U + \hat{A}_{RRG}[N] \cdot \sqrt{\frac{2\chi}{\chi-1} \frac{1}{R_L \cdot T_A}} \cdot n_j \cdot \hat{P}_A - \gamma_0\right)}{1 - \frac{T_{AB}}{2} \cdot \frac{R_L \cdot T_S}{V_S} \cdot \left(\hat{A}_{RDK}[N] \cdot \sqrt{\frac{2\chi}{\chi-1} \frac{1}{R_L \cdot T_S}} \cdot m_i + \hat{A}_{RRG}[N] \cdot \sqrt{\frac{2\chi}{\chi-1} \frac{1}{R_L \cdot T_A}} \cdot m_j - \gamma_1\right)}$$

for N=(1 . . . ∞) and i, j–(1 . . . k) (5.2)

In this case, [N] denotes the current segment, or the current computation step, and [N+1] denotes the next segment, or the next computation step.

If the total pressure in the inlet pipe is known, then the change in the residual-gas partial pressure $P_{RG}$ in the inlet pipe can be calculated according to the following relationship:

$$\dot{\hat{P}}_{RG} = \frac{R_L \cdot T_S}{V_S} \cdot \left(\hat{\dot{m}}_{RG} - \hat{\dot{m}}_{Zyl\_RG}\right) \quad (6.0)$$

with equation (3.0)

$$\hat{\dot{m}}_{RG} = \hat{A}_{RRG} \cdot \sqrt{\frac{2\chi}{\chi-1} \frac{1}{R_L \cdot T_A}} \cdot \hat{P}_A \cdot \left(m_j \cdot \frac{\hat{P}_S}{\hat{P}_A} + n_j\right)$$

as the residual-gas mass flow through the exhaust-gas recycling valve, and with $$\hat{\dot{m}}_{Zyl\_RG} = \gamma_1 \cdot \hat{P}_{RG} \quad (7.0)$$

as the residual-gas mass flow into the cylinder through external exhaust-gas recycling.

If the trapezium rule (5.1) is applied to solve the differential equation (6.0) for the residual-gas partial pressure in the inlet pipe, then the following relationship results:

$$\hat{P}_{RG}[N] = \frac{\hat{P}_{RG}[N-1] + \frac{T_{AB}}{2} \cdot \left(\hat{P}_S[N-1] + \frac{R_L \cdot T_S}{V_S} \cdot \hat{A}_{RRG}[N] \cdot \sqrt{\frac{2 \cdot \kappa}{(\kappa-1) \cdot R_L \cdot T_A}} \cdot n_j\right)}{1 - \frac{T_{AB}}{2} \cdot \frac{R_L \cdot T_S}{V_S} \cdot \left(\hat{A}_{RRG}[N] \cdot \sqrt{\frac{2 \cdot \kappa}{(\kappa-1) \cdot R_L \cdot T_A}} \cdot m_j - \gamma_1\right)} \quad (8.1)$$

for calculating the residual-gas partial pressure at time N. The following relationship is also satisfied:

$$\hat{P}_S = \hat{P}_{FG} + \hat{P}_{RG} \quad (9.0)$$

The fresh-gas partial pressure $\hat{P}_{FG}$ is then:

$$\hat{P}_{FG} = \hat{P}_S - \hat{P}_{RG} \quad (9.1)$$

The fresh-gas and residual-gas partial pressures in the inlet pipe are therefore known in steady and unsteady engine operation. With the fresh-gas partial pressure, it is possible to calculate the fresh-air mass flow into the respective cylinders:

$$\hat{\dot{m}}_{ZYL\_FG} = \gamma_1 \cdot \hat{P}_{FG} + \gamma_0 \quad (10.0)$$

Through a simple integration algorithm, the air mass taken in by the internal combustion engine during an intake phase is obtained.

$$\hat{m}_{ZYL\_FG} = \frac{T_{AB}}{2} \cdot \left(\hat{\dot{m}}_{ZYL\_FG}[N] + \hat{\dot{m}}_{ZYL\_FG}[N-1]\right) \quad (10.1)$$

Owing to dead times due to the system in the fuel metering and a requisite pre-accumulation of fuel, it is desirable to predict the air mass taken in by the internal combustion engine with a selectable prediction horizon, since only in this way is it possible, in unsteady operation, to keep accurately to a required air/fuel ratio.

In the described process, the model variables of the time variation of the partial pressures in the intake system are present in analytical form. Through H-fold application of the trapezium rule, the fresh-gas partial pressure can be predicted by H segments through the relationship $$\hat{P}_{FG}[N+H] = \quad (10.2)$$

$$\hat{P}_{FG}[N] + \frac{T_{AB}}{2} \cdot H \cdot \left(\hat{\dot{P}}_S[N-1] - \hat{\dot{P}}_{RG}[N-1] + \hat{\dot{P}}_S[N] - \hat{\dot{P}}_{RG}[N]\right)$$

If constant values $\gamma_1$ and $\gamma_0$ are assumed over the prediction time, then the predicted fresh-air mass in the cylinder can be determined by the equation $$\hat{m}_{Zyl\_FG}[N+H] = \quad (10.3)$$

-continued $$T_{AB} \cdot \left( \gamma_1 \cdot \left[ \hat{P}_{FG}[N] + (H + 0.5) \cdot \frac{T_{AB}}{2} \left( \hat{P}_S[N-1] - \hat{P}_{RG}[N-1] + \hat{P}_S[N] - \hat{P}_{RG}[N] \right) \right] + \gamma_0 \right)$$

If values of the order of 1 . . . 3 are chosen for the prediction horizon H, then prediction results for the fresh-gas mass taken in by the internal combustion engine can be obtained with high accuracy using the formula (10.3).

The principle of the model balancing for engine control systems based on air mass and on inlet pipe pressure will be described below.

Owing to the use of engines of variable valve control and/or varying inlet pipe geometry, to manufacturing tolerances and aging phenomena, as well as to the effects of temperature, the values of $\gamma_1$ and $\gamma_0$ are subject to some uncertainty. The parameters in the equation for determining the mass flow in the cylinders are, as described above, functions of a variety of influencing variables, of which only the most important can be detected.

When calculating the mass flow at the throttle valve, the measuring errors in detecting the throttle valve angle and approximation errors in the polynomial approximation of the flow function $\psi$ have repercussions on the model variables. In particular when the throttle valve angles are very small, the system sensitivity to the aforementioned errors is particularly high. The result of this is that small change in the throttle valve setting have a serious influence on the mass flow or inlet pipe pressure. In order to reduce the effect of these influences, a process will be proposed below which makes it possible to correct particular variables which have an influence on the model calculation, in such a way that accuracy-enhancing model adaptation can be carried out for steady and unsteady engine operation.

The adaptation of the essential parameters of the model for determining the load variable of the internal combustion engine is carried out in that the reduced flow cross section $\hat{A}_{RDK}$ determined by the measured throttle valve angle is corrected by the correction variable $\Delta\hat{A}_{RDK}$ $$\hat{A}_{RDK\_KORR} = \hat{A}_{RDK} + \Delta\hat{A}_{RDK} \qquad (11.0)$$

According to which load detection sensor is used, the calculation of the correction variable $\Delta\hat{A}_{RDK}$ takes place in a model control loop. In the case of an air mass measurement, the deviation between the measured air mass flow at the throttle valve and the model air mass flow at the throttle valve is calculated.

In the case of an inlet pipe measurement, the deviation between the model inlet pipe pressure and the measured inlet pipe pressure is calculated.

For engine control systems based on air mass, the air mass flow $\dot{m}_{DK\_LMM}$ measured by the air mass meter at the throttle valve is thus the reference variable of the control loop, while for systems based on inlet pipe pressure, the inlet pipe pressure $P_{S\_SEN}$, measured by the inlet pipe pressure sensor is used as the reference variable. Through closed-loop control, the value of $\Delta\hat{A}_{RED}$ is then determined in such a way as to minimize the deviation between the reference variable and the corresponding control variable.

In order to achieve improvements in accuracy with the aforementioned method even in dynamic operation, the measurement detection must reproduce the reference variables as exactly as possible. In most cases, the dynamic response of the sensor, that is to say either the air mass meter or the inlet pipe pressure sensor, and subsequently formed averaging needs to be taken into account.

The dynamic response of the respective sensor can at first approximation be modeled as a first-order system with a delay time $T_1$ that may possibly depend on the working point.

In the case of an engine control system based on the inlet pipe pressure, one possible equation for describing the sensor response is written as follows:

$$\hat{P}_{S\_SEN}[N] = \hat{P}_{S\_SEN}[N-1] \cdot e^{-\frac{T_{AB}}{T_1}} + \hat{P}_S[N-1] \cdot \left(1 - e^{-\frac{T_{AB}}{T_1}}\right) \qquad (12.0)$$

while for a system based on air mass, the following relationship may be specified:

$$\hat{\dot{m}}_{DK\_LMM}[N] = \qquad (13.0)$$
$$\hat{\dot{m}}_{DK\_LMM}[N-1] \cdot e^{-\frac{T_{AB}}{T_1}} + \hat{\dot{m}}_{DK}[N-1] \cdot \left(1 - e^{-\frac{T_{AB}}{T_1}}\right)$$

$T_1$ denotes the delay time of the respective sensor. The averaging of the measurements over a segment, which is carried out in the control device, can be modeled by the equations $$\hat{P}_{S\_SEN\_MIT}[N] = \frac{1}{2} \cdot \left(\hat{P}_{S\_SEN}[N-1] + \hat{P}_{S\_SEN}[N]\right) \qquad (12.1)$$

or $$\hat{\dot{m}}_{DK\_LMM\_MIT}[N] = \frac{1}{2} \cdot \left(\hat{\dot{m}}_{DK\_LMM}[N-1] + \hat{\dot{m}}_{DK\_LMM}[N]\right) \qquad (13.1)$$

Should both load-detection sensors be present, then the reduced flow cross section at the throttle valve or the ambient pressure can be used to balance the air mass flow at the throttle valve with the measured air mass flow. In exhaust-gas recycling operation, the inlet pipe pressure sensor can be used to determine the reduced flow cross section at the exhaust-gas recycling valve or to determine the exhaust-gas back pressure.

Figure 3:
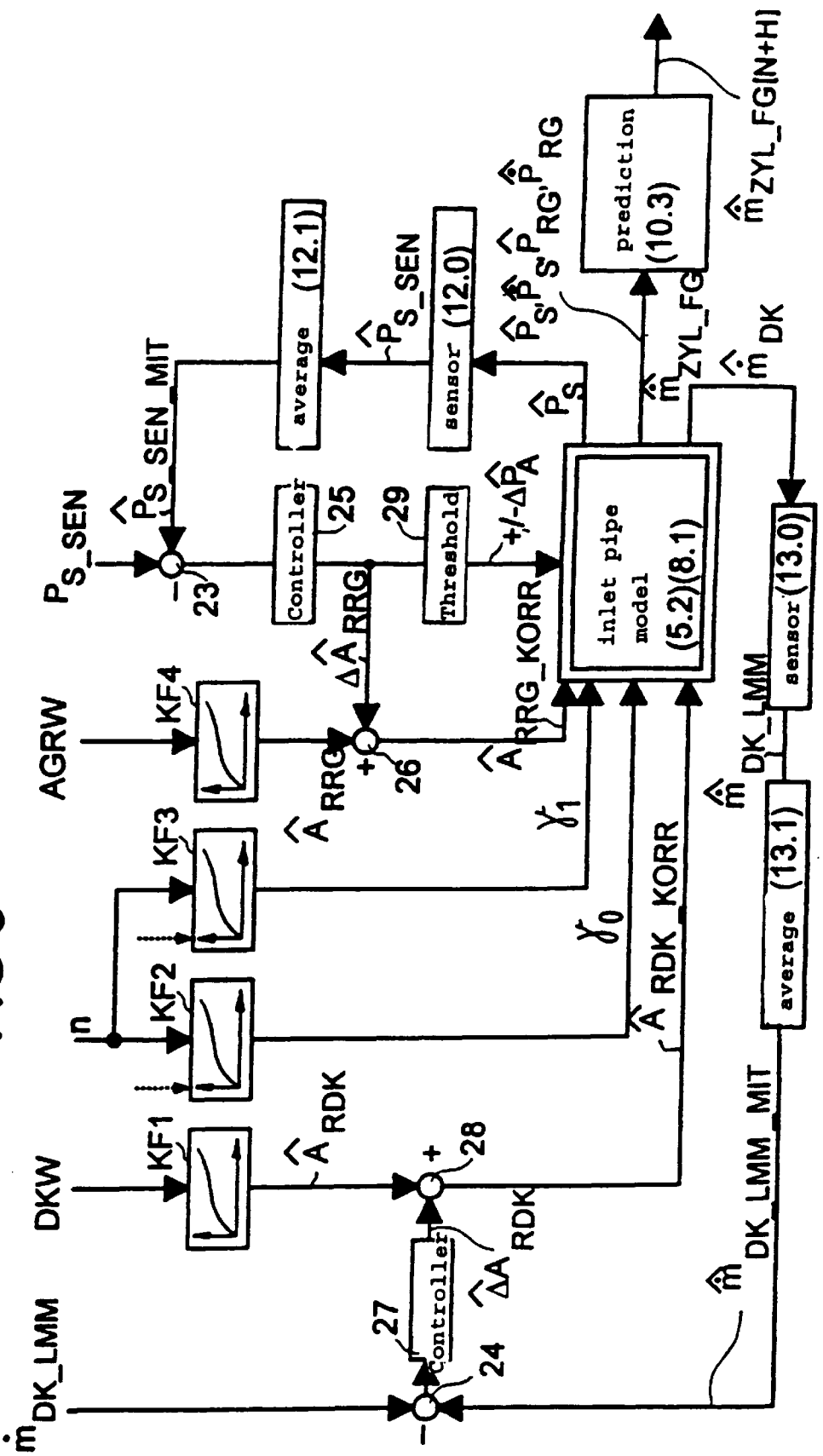
FIG. 3 is a block diagram of a model control loop for determining a fresh-air mass flowing into cylinders of the internal combustion engine in a case of active exhaust-gas recycling.

If differences occur between the model inlet pipe pressure and the measured inlet pipe pressure, then they are evened out by adapting the residual-gas mass flow through the correction of $\hat{A}_{RRG}$ by $\Delta\hat{A}_{RRG}$ (FIG. 3). If the corrective variable $\Delta\hat{A}_{RRG}$ exceeds a particular threshold in the positive direction, then the model variable of exhaust-gas back pressure is increased, and if it falls below a negatively applicable threshold, then the model variable of exhaust-gas back pressure is reduced.

When the exhaust-gas recycling valve is closed, the relationship between the inlet pipe pressure and the air mass is corrected using the inlet pipe pressure sensor with the aid of the parameter $\gamma_1$ (FIG. 4). The correction variable is determined as a function of the engine speed and entered in the non-volatile memory of the control device. The correction value is limited to a maximum value.

A model balancing method for engine control systems will be described below for when both load detection sensors (air mass meter and inlet pipe pressure sensor) are present. For the system, the model structures represented in FIGS. 3 and 4 may be taken.

The throttle valve setting sensor 14 (FIG. 1) delivers a signal corresponding to the degree to which the throttle valve 11 is open, for example a throttle valve aperture angle DKW. In a first performance characteristic KF1 of the electronic engine control device, associated values of the reduced cross section of the throttle valve $\Delta\hat{A}_{RDK}$ are stored for various values of this throttle valve aperture angle. The subsystem "inlet pipe model" in FIGS. 3 and 4 represents the behavior described by equations (5.2) and (8.1).

The reference variables of the model control loop are the measurements of the variables, averaged over a segment of the air mass flow $\hat{m}_{DK\_LMM}$ at the throttle valve and of the inlet pipe pressure $P_{S\_SEN}$ controller is used as the controller in the model loops, then the residual deviation is zero, that is to say the model variables and the corresponding measured variables are identical in the steady-state case.

The pulsation phenomena of the air mass flow at the throttle valve, which are observed primarily with 4-cylinder engines, lead, in the case of air mass meters forming the value, to considerable positive measurement errors and therefore to a reference variable strongly affected by error. By turning off the corresponding controller, that is to say reducing the controller parameters, it is possible to change over to controlled model-assisted operation. Regions in which the aforementioned pulsations occur can therefore be treated with the same method, while taking dynamic relationships into account, such as those regions in which there is a substantially unperturbed reference variable. In contrast to methods that take relevant measurements into account only at steady operating points, the described system remains workable virtually without restriction. If the signal from the air mass meter or from the throttle valve setting sensor is lost, the proposed system is capable of forming a corresponding substitute signal. If the reference variable is lost, controlled operation must be carried out, while in the other case controlled operation guarantees scarcely impaired functional capability of the system.

The "inlet pipe model" block represents the ratios as described with the aid of equations (5.2) and (8.1), and consequently has the model variables $\hat{P}_S$ and $\hat{m}_{DK}$ as outward variables, as well as the value $\hat{m}_{Zyl\_FG}$ of the fresh-gas mass flow into the cylinder of the internal combustion engine, this being used as a basis for determining the basic injection time. After the modeling of the sensor response of the air mass meter, and of the inlet pipe pressure sensor (equations 12.0 and 13.0, respectively) the model variables $\hat{P}_S$ and $\hat{m}_{DK}$ are subjected to averaging according to equation (12.1) or (13.1), respectively, so that the averaged variables $\hat{P}_{S\_SEN\_MIT}$ $\hat{m}_{DK\_LMM\_MIT}$ and the value $P_{S\_SEN}$ measured by the inlet pipe pressure sensor, or the air mass flow $\hat{m}_{DK\_LMM}$ measured by the air mass meter, respectively, can in each case be fed to a comparison point 23, 24.

The difference between the measured variables and the model variables of the averaged mass flow at the throttle valve, which is formed at the comparison point 24, is used in FIG. 3 and FIG. 4 as a basis for calculating the correction value $\Delta\hat{A}_{RDK}$ in the controller 27. The model variable of the reduced cross section is formed according to equation (11.0) and makes it possible to correct the model variable of the mass flow at the throttle valve in steady and unsteady engine operation.

In FIG. 3, the difference between the averaged measured variable and the corresponding model variable of the inlet pipe pressure is used to calculate a correction value $\Delta\hat{A}_{RRG}$ for influencing the residual-gas mass flow at the exhaust-gas recycling valve. If the correction value $\Delta\hat{A}_{RRG}$ exceeds a threshold established in a thresholding stage 29, then the exhaust-gas back pressure $\hat{P}_A$ is corrected in the positive or negative direction in accordance with the sign of $\Delta\hat{A}_{RRG}$.

In FIG. 4, the difference between the averaged measured variable and the corresponding model variable of the inlet pipe pressure is used to correct the mass flow into the cylinder by influencing $\gamma_1$.

The method proposed in FIG. 3 offers the advantage that, even in the event of parameter errors in the model for estimating the load variable, smooth profiles of the load variable can be expected since the order difference between the corrective measure and the load variable is one. However, it is necessary to estimate the ambient pressure as a function of the value of $\Delta\hat{A}_{RDK}$ or the pressure ratio. The method proposed in FIG. 4 offers the advantage that, even in the case of large pressure ratios $$\frac{\hat{P}_S}{\hat{P}_U},$$

the mass flow into the cylinder can be varied in broad ranges. Changes in the flow coefficients of the intake valves can be corrected readily with this method.

We claim:

1. In a process for determining a quantity of fresh-air mass flowing into a cylinder of an internal combustion engine, the internal combustion engine having an inlet pipe, a throttle valve, a first sensor device for detecting a degree of opening of the throttle valve, an exhaust-gas recycling device with an exhaust-gas recycling valve, a second sensor device for detecting a degree of opening of the exhaust-gas recycling valve, a load sensor producing a load signal, and an electronic control device calculating a basic injection time on a basis of the load signal and a speed of the internal combustion engine, the improvement which comprises:

reproducing conditions in the inlet pipe using an inlet pipe flow model, and using the degree of opening of the throttle valve, the degree of opening of the exhaust-gas recycling valve, an ambient pressure, an exhaust-gas temperature, a temperature in the inlet pipe and parameters representing a valve setting as input variables of the inlet pipe flow model;

forming a model variable for an air mass flow at the throttle valve and for a residual-gas mass flow at the exhaust-gas recycling valve;

forming a model variable for an air mass flow into the cylinder as a function of an inlet pipe pressure;

forming a model variable for a residual-gas mass flow into the cylinder as a function of a residual-gas partial pressure;

calculating the inlet pipe pressure as a decisive variable for determining an actual load of the internal combustion engine from the model variables of air mass flow at the throttle valve, the residual-gas mass flow at the exhaust-gas recycling valve and the air mass flow into the cylinder;

calculating the residual-gas partial pressure in the inlet pipe from the model variables of the residual-gas mass flow at the exhaust-gas recycling valve and the residual-gas mass flow into the cylinder;

determining a fresh-gas partial pressure from the inlet pipe pressure and the residual gas partial pressure; and deriving a total air mass flowing into the cylinder by integrating a relationship between the fresh-gas partial pressure and a fresh-air mass flow into the cylinder.

2. The process according to claim 1, which comprises defining the model variables for the air mass flow at the throttle valve and for the residual-gas mass flow at the exhaust-gas recycling valve with the aid of a flow equation for ideal gases through throttle points.

3. The process according to claim 2, which comprises reducing flow cross sections at the throttle points for taking into account flow losses occurring at the throttle points.

4. The process according to claim 3, which comprises establishing values for the reduced flow cross sections from steady-state measurements as a function of the degree of opening of the exhaust-gas recycling valve on an engine test bed, and entering the values in performance characteristics stored in a memory of the electronic control device.

5. The process according to claim 2, which comprises representing the model variables for the air mass flow at the throttle valve and the model variable for the residual-gas mass flow at the exhaust-gas recycling valve by dividing a flow function present in the flow equation into individual sections and approximating the sections by straight-line sections, determining values of a slope and an offset of respective straight-line sections as a function of ratios of the inlet pipe pressure to the ambient pressure and of the inlet pipe pressure to an exhaust-gas back pressure, respectively, and storing the values in a performance characteristic stored in a memory of the electronic control device.

6. The process according to claim 1, which comprises:

defining the model variable for the air mass flow into the cylinder as a linear function of the inlet pipe pressure; and establishing a slope and an offset of the linear function as a function of at least one parameter including the speed of the internal combustion engine, cylinder number, inlet pipe geometry, air temperature in the inlet pipe and valve control times.

7. The process according to claim 1, which comprises:

defining the model variable for the residual-gas mass flow into the cylinder as a linear function of the residual-gas partial pressure; and establishing a slope of the linear function as a function of at least one parameter including the speed of the internal combustion engine, cylinder number, inlet pipe geometry, air temperature in the inlet pipe and valve control times.

8. The process according to claim 6, which comprises determining the at least one parameter by steady-state measurements on the engine test bed and entering the at least one parameter in performance characteristics stored in a memory of the electronic control device.

9. The process according to claim 7, which comprises determining the at least one parameter by steady-state measurements on the engine test bed and entering the at least one parameter in performance characteristics stored in a memory of the electronic control device.

10. The process according to claim 1, which comprises using the load signal measured by the load sensor for correcting and balancing the model variables of the air mass flow at the throttle valve and the inlet pipe pressure in a model control loop, and using the load signal as a reference variable of the control loop.

11. The process according to claim 10, which comprises carrying out the correcting and balancing step in one of steady and unsteady operation of the internal combustion engine for taking into account a response of the load sensor.

12. The process according to claim 11, which comprises modeling the response of the load sensor with a first-order system having a delay time dependent on a working point.

13. The process according to claim 11, which comprises:

assigning each measured value of the degree of opening of the throttle valve a value of a reduced cross section of the throttle valve; and correcting the reduced cross section by a correction variable for minimizing a deviation between a reference variable and the model variable of the air mass flow at the throttle valve for balancing the model variable of the air mass flow at the throttle valve.

14. The process according to claim 11, which comprises:

assigning each measured value of the degree of opening of the exhaust-gas recycling valve a value of a reduced cross section of the exhaust-gas recycling valve; and correcting the reduced cross section by a correction variable to minimize the deviation between a reference variable and the model variable of the inlet pipe pressure for balancing the model variable of the inlet pipe pressure.

15. The process according to claim 13, which comprises averaging the model variable before performing the correcting step.

16. The process according to claim 14, which comprises averaging the model variable before performing the correcting step.

17. The process according to claim 14, which comprises increasing a model variable of an exhaust-gas back pressure if the correction variable exceeds a predetermined threshold value in a positive direction, and reducing the model variable of the exhaust-gas back pressure if the correction variable falls below a negative threshold.

18. The process according to claim 1, which comprises calculating the air mass flowing into the cylinder by the relationship $$\hat{m}_{Zyl}[N] = \frac{T_A}{2} \cdot (\hat{m}_{Zyl}[N-1] + \hat{m}_{Zyl}[N])$$

with $T_A$=sampling time or segment time, $\hat{m}_{Zyl}[N]$=model variable of the air mass flow during the current sampling step or segment, and $\hat{m}_{Zyl}[N-1]$=model variable of the air mass flow during the previous sampling step or segment.

19. The process according to claim 1, which comprises estimating a fresh-gas mass flowing into the cylinder of the internal combustion engine for a specific prediction horizon lying in the future relative to a current load detection at a sampling time on a basis of time variations in the model variables of the residual-gas partial pressure and the fresh-gas partial pressure in the inlet pipe.

* * * * *